(12) United States Patent
Huang (10) Patent No.: US 9,906,779 B2
(45) Date of Patent: Feb. 27, 2018

(54) CODED ILLUMINATOR AND LIGHT FIELD PROJECTION DEVICE USING THE SAME

(71) Applicant: DELTA ELECTRONICS, INC., Kuei San (TW)

(72) Inventor: June-Jei Huang, Kuei San (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 94 days.

(21) Appl. No.: 14/518,814

(22) Filed: Oct. 20, 2014

(65) Prior Publication Data
US 2016/0073100 A1    Mar. 10, 2016

(30) Foreign Application Priority Data
Sep. 10, 2014  (TW) .............................. 103131079 A (51) Int. Cl.
H04N 13/04        (2006.01)
G02B 26/08        (2006.01)
H04N 9/31         (2006.01)

(52) U.S. Cl.
CPC ..... H04N 13/0427 (2013.01); G02B 26/0833 (2013.01); H04N 13/045 (2013.01); H04N 13/0459 (2013.01); H04N 9/3126 (2013.01)

(58) Field of Classification Search
CPC ............... H04N 9/0402; H04N 9/3126; H04N 13/0402; H04N 13/0427; H04N 13/0459; G02B 26/0833; G09G 3/3426
(Continued)

(56) References Cited

U.S. PATENT DOCUMENTS

| 7,283,308 B2 | 10/2007 | Cossairt et al. |
| 7,894,419 B2 | 2/2011 | Turpin et al. |

(Continued)

FOREIGN PATENT DOCUMENTS

| CN | 102436169 | 5/2012 |
| CN | 103576439 | 2/2014 |
| TW | 201106085 | 2/2011 |

OTHER PUBLICATIONS

Kanebako, Tsubasa et al. "Time-Multiplexing Display Module for High-Density Directional Display", Stereoscopic Displays and Applications XIX, A. Woods, N. Holliman, and J. Merritt, eds., Proc. SPIE-IS&T Electronic Imaging 6803, 68030P (2008).
(Continued)

*Primary Examiner* — Christina Riddle
*Assistant Examiner* — Christopher Lamb, II
(74) *Attorney, Agent, or Firm* — Hauptman Ham, LLP (57) ABSTRACT

A coded illuminator includes a light source, a light-uniform element, a coding element, and an optical module. The light source is configured to provide a light beam. The light-uniform element is configured to make the light beam uniform. The coding element has a plurality of viewing units arranged along a row direction. The coding element includes a plurality of reflective elements arranged in an array manner and a control unit connected to the reflective elements. In any time period, the reflective elements are respectively in an on state or an off state. In at least one of the viewing units, the reflective elements in on state compose a reflective area extending along a column direction being substantially perpendicular to the row direction. The gray scale of the viewing unit is decided by the number of reflective elements in the on state.

8 Claims, 5 Drawing Sheets

(58) Field of Classification Search
USPC .................................................. 353/7, 8, 30
See application file for complete search history.

(56) References Cited

U.S. PATENT DOCUMENTS

| | | | |
|---|---|---|---|
| 7,944,465 B2 | 3/2011 | Goulanian et al. | |
| 2008/0055493 A1* | 3/2008 | Hanano .............. | G02B 27/1033 349/9 |
| 2008/0158245 A1* | 7/2008 | Lieb ....................... | G09G 3/007 345/596 |
| 2011/0316898 A1* | 12/2011 | Nam .................. | G02B 27/2214 345/690 |
| 2015/0124175 A1* | 5/2015 | Perkins .............. | G02B 13/0095 348/759 |

OTHER PUBLICATIONS

Ishinabe, Takahiro et al. "High-Resolution Floating Autostereoscopic 3D Display Based on Iris-Plane-Dividing Technology", SID Int. Symp. Digest Tech. Papers 17.5, pp. 225-228 (2012).

Hirsch, Matthew, et al., "A Compressive Light Field Projection System", ACM Proc. of SIGGRAPH Transactions on Graphics 33, 4 (2014).

* cited by examiner

CODED ILLUMINATOR AND LIGHT FIELD PROJECTION DEVICE USING THE SAME

RELATED APPLICATIONS

This application claims priority to Taiwan Application Serial Number 103131079, filed Sep. 10, 2014, which is herein incorporated by reference.

BACKGROUND

Field of Invention

The present invention relates to a coded illuminator.

Description of Related Art

Exploiting the binocular parallax of humans, a stereoscopic display provides two different images respectively to the two eyes of an observer, such that the observer can experience a stereoscopic image. An autostereoscopic display, unlike other kinds of stereoscopic displays which require special glasses to distinguish left-eye and right-eye images, provides a plurality of images by using a plurality of light sources, in which the images are projected to different spatial positions. The eyes of an observer can receive different images so that the observer perceives a stereoscopic image when his or her eyes correspond to any two of the spatial positions respectively. Autostereoscopic display technology overcomes the problems associated with the use of glasses in stereoscopic display technology, and has become an area of major development in recent times. However, with the development of the autostereoscopic display technology, how to increase the number of views is a problem that many in the industry are striving to solve.

SUMMARY

An aspect of the present invention is to provide a coded illuminator including a light source, a light-uniform element, a coding element, and an optical module. The light source is configured for providing a light beam. The coding element has a plurality of viewing units arranged along a row direction, and the coding element includes a plurality of reflective elements and a control unit. The reflective elements are arranged in an array manner. The control unit is connected to the reflective elements, such that in any time period, the reflective elements are respectively in an on state or an off state. In at least one of the viewing units, the reflective elements in on state compose a reflective area extending along a column direction, and the column direction is substantially perpendicular to the row direction. The gray scale of the viewing unit is decided by the number of reflective elements in the on state. The optical module is configured for guiding the uniform light beam to the coding element. The light beam reflected from the viewing units travels back to the optical module and respectively corresponds to different views.

In one or more embodiments, each of the viewing units comprises X columns and Y rows of the reflective elements, where X is equal to or greater than 1 and Y is greater than 1.

In one or more embodiments, a center of the reflective area is located at at least one of the reflective elements of the Y/2 row, at at least one of the reflective elements of the (Y+1)/2 row, or between the reflective elements of the Y/2 row and the (Y+1)/2 row.

In one or more embodiments, the coding element is a digital micro-mirror device.

In one or more embodiments, the optical module includes a first prism and a second prism. The first prism has a first side, a second side, and a third side. The coding element is disposed at the first side. The second prism defines a gap with the second side of the first prism. The light beam is incident to the first prism from the third side, reflected to the first side by the gap and reaching the coding element. The coding element then reflects the light beam back to the first side, and the light beam sequentially passes through the gap and the second prism.

Another aspect of the present invention is to provide a light field projection device includes a coded illuminator, a second light-uniform element, a first light modulator, a lens, and a second optical module. The coded illuminator includes a light source, a first light-uniform element, a coding element, and a first optical module. The light source is configured for providing a light beam. The first light-uniform element is configured for making the light beam uniform. The coding element has a plurality of viewing units arranged along a row direction, and the coding element includes a plurality of reflective elements and a control unit. The reflective elements are arranged in an array manner. The control unit is connected to the reflective elements, such that in any time period, the reflective elements are respectively in an on state or an off state. In at least one of the viewing units, the reflective elements in on state compose a reflective area extending along a column direction, and the column direction is substantially perpendicular to the row direction. The gray scale of the viewing unit is decided by the number of reflective elements in the on state. The first optical module is configured for guiding the uniform light beam to the coding element. The light beam reflected from the viewing units travels back to the optical module and respectively corresponds to different views. The second light-uniform element is disposed between the first light-uniform element and the first optical module. The first light modulator is configured for sequentially modulating the light beam to a plurality of images. The second optical module is configured for guiding the light beam leaving the first optical module to the first light modulator, and guiding the images to the lens.

In one or more embodiments, an optical path between the second light-uniform element and the first light modulator forms a relay system, the coding element is disposed at a stop of the relay system.

In one or more embodiments, an image surface of the light beam coming from the exit of the first light-uniform element is on the coding element, an image surface of the light beam coming from the exit of the second light-uniform element is on the first light modulator, and an image surface of the light beam reflected from the coding element is in the lens.

In one or more embodiments, the second optical module includes a first prism and a second prism. The first prism has a first side, a second side, and a third side. The first light modulator is disposed at the first side. The second prism defines a gap with the second side of the first prism. The light beam is incident to the first prism from the third side, reflected to the first side by the gap and reaching the first light modulator. The first light modulator then reflects the light beam back to the first side, and the light beam sequentially passes through the gap and the second prism.

In one or more embodiments, the light field projection device further includes a second light modulator and a third light modulator. The second optical module further includes a color separation prism group disposed between the first prism and the first light modulator. The first light modulator, the second light modulator, and the third light modulator are respectively disposed at three sides of the color separation prism group.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

It will be understood that, although the terms first, second etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 1:
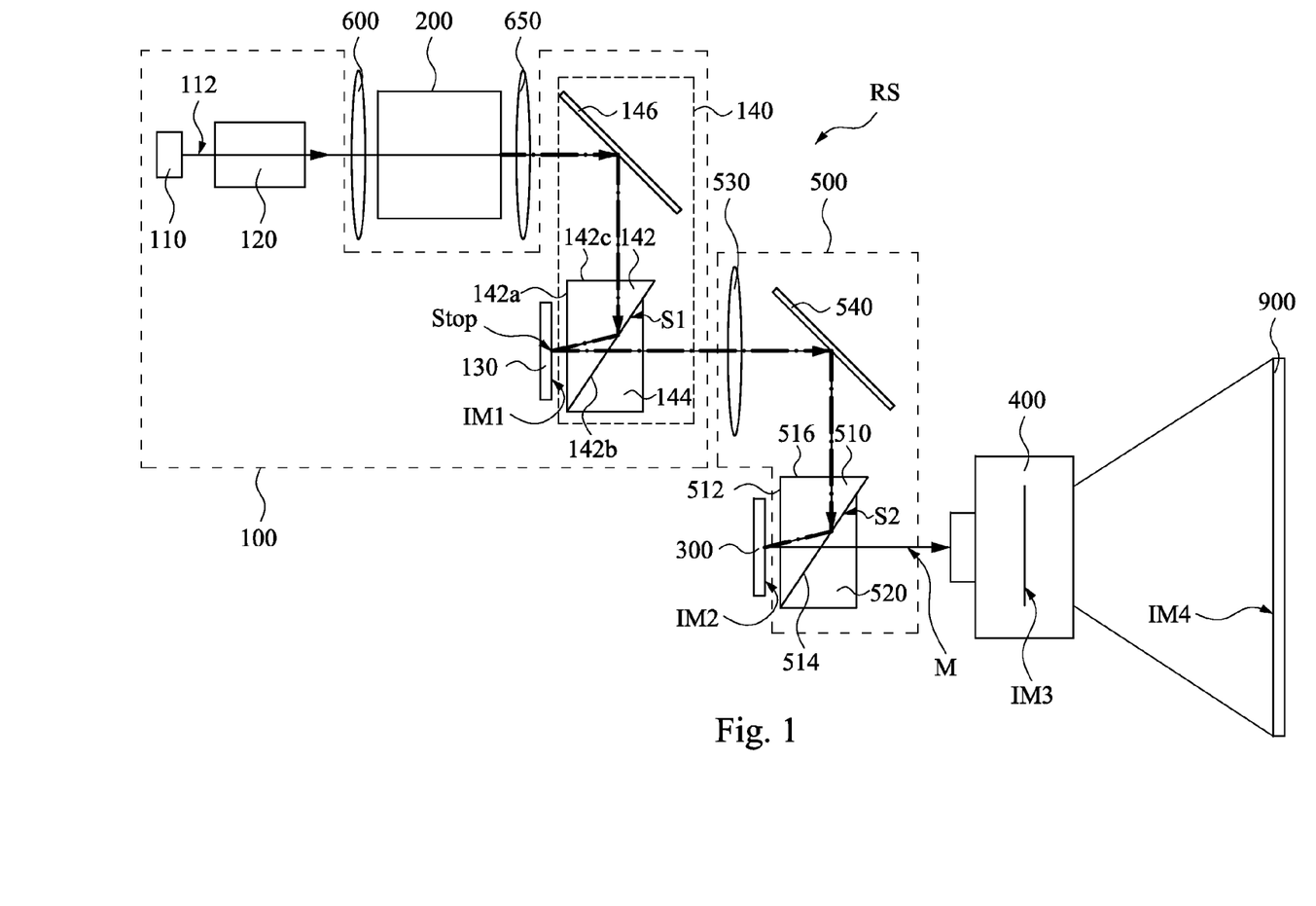
FIG. 1 is a schematic diagram of a light field projection device according to one embodiment of the present invention.

FIG. 1 is a schematic diagram of a light field projection device according to one embodiment of the present invention. The light field projection device includes a coded illuminator 100, a second light-uniform element 200, a first light modulator 300, a lens 400, and a second optical module 500. The coded illuminator 100 includes a light source 110, a first light-uniform element 120, a coding element 130, and a first optical module 140. The light source 110 is configured for providing a light beam 112. The first light-uniform element 120 is configured for making the light beam 112 uniform. The first optical module 140 is configured for guiding the uniform light beam 112 to the coding element 130. The light beam 112 reflected from the coding element 130 travels back to the first optical module 140 and respectively corresponds to different views. The second light-uniform element 200 is disposed between the first light-uniform element 120 and the first optical module 140. The first light modulator 300 is configured for sequentially modulating the light beam 112 to a plurality of images M. The second optical module 500 is configured for guiding the light beam 112 leaving the first optical module 140 to the first light modulator 300, and guiding the images M to the lens 400.

Figure 2:
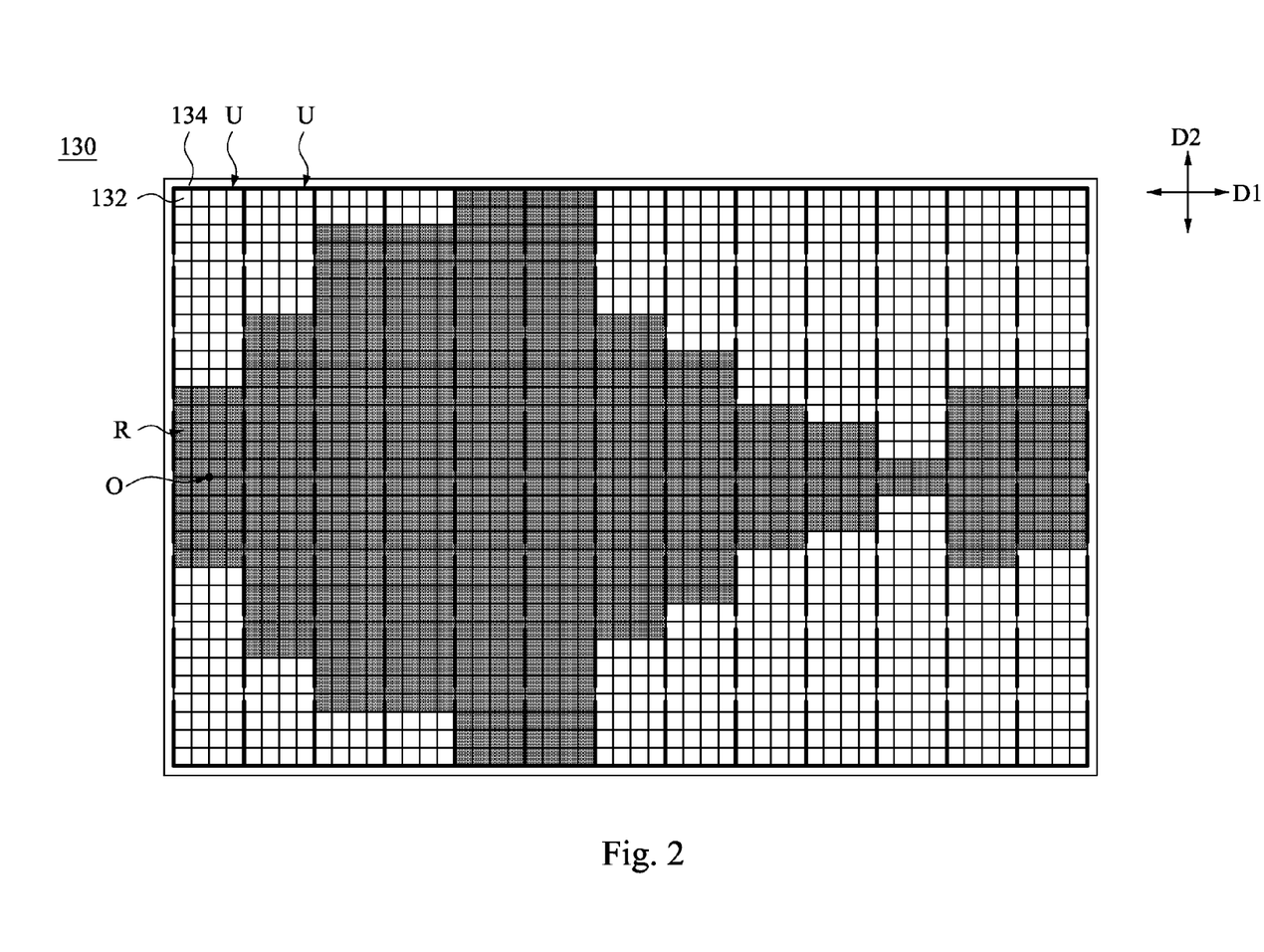
FIG. 2 is a front view of a coding element of FIG. 1 in one time period.

FIG. 2 is a front view of the coding element 130 of FIG. 1 in one time period. The coding element 130, which can be a digital micro-mirror device, has a plurality of viewing units U arranged along a row direction D1. The coding element 130 includes a plurality of reflective elements 132 and a control unit 134. The reflective elements 132 are arranged in an array manner. The control unit 134 is connected to the reflective elements 132 (for example, the control unit 134 in FIG. 2 can be a circuit module disposed behind the reflective elements 132, and the claimed scope of the present invention is not limited in this respect), such that in any time period, the reflective elements 132 are respectively in an on state or an off state. The on/off states are defined by the tilt angles of the reflective element 132. In other words, the reflective element 132 in on state has a tilt angle that reflects the portion of the light beam 112 (see FIG. 1) impinging on the reflective element 132 back to the first optical module 140 (see FIG. 1), and the reflective element 132 in off state has a tilt angle that reflects the light beam 112 impinging on the reflective element 132 to other place and makes the portion of the light beam 112 leave the optical path of the light field projection device. For clarity, in FIG. 2, the reflective elements 132 in on state are filled with dot patterns. In at least one of the viewing units U, the reflective elements 132 in on state compose a reflective area R extending along a column direction D2, and the column direction D2 is substantially perpendicular to the row direction D1. The gray scale of the viewing unit U is decided by the number of reflective elements 132 in the on state. The light beam 112 reflected from the viewing units U travels back to the first optical module 140 and respectively corresponds to different views. That is, the light beams 112 reflected from different viewing units U are projected to different views.

In this embodiment, with a specific algorithm, the light field projection device can produce different viewing frames which are respectively superposed by few images coded by the coding element 130. Therefore, it can produce more views with low frame rate. In greater detail, a conventional light field projector has to provide 100 frames sequentially as 100 views are provided. The conventional light field projector must have at least 100*60 Hz=6000 Hz frame rate if the frame rate of each view is 60 Hz. In fact, however, the 100 views have similar frames during the same time period, and these 100 frames can be simulated and respectively composed of less (for example, 25) basic images with different components (i.e., different image gray herein). Therefore, if the 25 basic images all have 60 Hz frame rates, the frame rate of the light field projection device of the present embodiment can be reduced to 25*60 Hz=1500 Hz. The detail of the algorithm can be found in the reference (M. Hirsch, G. Wetzstein, R. Raskar. A Compressive Light Field Projection System. ACM Proc. of SIGGRAPH (Transactions on Graphics 33, 4), 2014), and only an example is described hereinafter.

The following paragraphs provide a brief explanation of the principle of the algorithm mentioned above, and herein 25 basic images are used to simulate frames of 100 views simultaneously as an example. Assuming H1~H25 are image data of the 25 basic images, and G1(1)~G25(1) respectively correspond to the components of the 25 basic images in the first view, G1(2)~G25(2) respectively correspond to the components of the 25 basic images in the second view, and so on. The components herein represent the gray (or intensity) degree of the images. That is, the greater the component, the darker the gray; and the lower the component, the lighter the gray. For generating the frames in the same time period, the frame in the first view I(1) is composed by H1~H25 and G1(1)~G25(1):

I(1)=G1(1)*H1+G2(1)*H2+ . . . +G25(1)*H25; and the frame in the second view I(2) is composed by H1~H25 and G1(2)~G25(2):

I(2)=G1(2)*H1+G2(2)*H2+ . . . +G25(2)*H25; and so on the frames in the third view I(3) to the one hundredth view I(100).

The aforementioned frames I(1)~I(100) can be generated in 25 time periods, where each time period corresponds to a basic image. In greater detail, in a first time period, the image data H1 of the first basic image is combined with a light beam coded as G(t1)=[G1(1), G1(2), . . . , G1(100)]. In a second time period, the image data H2 of the second basic image is combined with a light beam coded as G(t2)=[G2(1), G2(2), . . . , G2(100)], and so on. Hence, after 25 time periods, the 100-view frames can be simultaneously simulated by the 25 basic images, thereby greatly reducing the frame rate. The examples of applying the aforementioned algorithm to achieve multi-view frames can be referred to the reference (M. Hirsch, G. Wetzstein, R. Raskar. A Compressive Light Field Projection System. ACM Proc. of SIGGRAPH (Transactions on Graphics 33, 4), 2014), and the description does not repeat hereinafter.

In this embodiment, the first light modulator 300 of FIG. 1 provides the aforementioned image data (i.e., H1~H25) in sequence, and the coding element 130 of FIG. 2 provides the components G(t1), G(t2), . . . in sequence, where the numbers of the aforementioned image data and the views are illustrative only, and should not limit the claimed scope. In greater detail, the viewing units U of FIG. 2 respectively correspond to different views, and the size of the reflective area R determines the values of G1(1)~G25(1), G1(2)~G25(2), and so on. That is, the larger the size of the reflective area R, the higher the gray degree, and the greater the values of G1(1)~G25(1), G1(2)~G25(2), and so on. For example, the coding element 130 of FIG. 2 provides 13 views, and the coding element 130 is coded as G=[10, 19, 27, 27, 32, 32, 18, 14, 8, 6, 2, 10, 9], where the values represent the number of rows of the reflective elements 132. For clarity, only 13 views, i.e., 13 viewing units U, are depicted in FIG. 2. However, the coding element 130 has 100 viewing units U if 100 views are provided.

The following paragraphs provide details with respect to the optical path of the light field projection device and its frame generation. Reference is made to FIGS. 1 and 2. After being uniform by the first light-uniform element 120 and the second light-uniform element 200, the light beam 112 provided by the light source 110 is guided to the coding element 130 by the first optical module 140. The viewing units U arranged along the row direction D1 divide the light beam 112 into light beams with different views. That is, the number of the viewing units U is that of the views. Hence, the light beams 112 reflected by the different viewing units U propagating along different direction while the overall propagation direction remains on the optical path of the light field projection device. The coding element 130 can individually adjust the grays of the portions of the light beam 112 corresponding to the viewing units U, i.e., code the light beam 112 with the aforementioned components G by adjusting the sizes of the reflective areas R of the viewing units U. The coded light beam 112 then enters the second optical module 500, and is guided to the first light modulator 300 by the second optical module 500. Therefore, the first light modulator 300 modulates the coded light beam 112 into images M which are the lights respectively superposed with the components G. For example, in the first time period, the images M(1)=G1(1)*H1, M(2)=G1(2)*H1, . . . are generated simultaneously, and in the second time period, the images M(1)=G2(1)*H2, M(2)=G2(2)*H2, . . . are generated simultaneously, and so on. The image M(1) is the image in the first view, M(2) is the image in the second view, and so on. These images M travel back to the second optical module 500 and are guided to the lens 400. The lens 400 then projects the images M onto a screen 900. Therefore, after 25 time periods, the light field projection device can generate the same slide of frames corresponding to 100 views. In the next 25 time periods, the light field projection device can generate next slide of frames corresponding to the 100 views as long as repeating the aforementioned process. Therefore, for 60 Hz frame generation, the frame rate of the light field projection device with 100 views can be reduced to 25*60 Hz=1500 Hz.

Reference is made again to FIG. 1. In this embodiment, the image surface IM1 of the light beam 112 coming from the exit of the first light-uniform element 120 is on the coding element 130. That is, the first light-uniform element 120 is configured to make the light beam 112 impinging on the coding element 130 uniform, such that the light beam 112 can distribute on the coding element 130 uniformly. The image surface IM2 of the light beam 112 coming from the exit of the second light-uniform element 200 is on the first light modulator 300. That is, the second light-uniform element 200 is configured to make the light beam 112 impinging on the first light modulator 300 uniform, such that the light beam 112 can distribute on the first light modulator 300 uniformly. The image surface IM3 of the light beam 112 reflected from the coding element 130 is in the lens 400, more specifically, in the exit pupil of the lens 400. That is, the light beams of the images M of different views pass different positions of the exit pupil of the lens 400. Moreover, the image surface IM4 of the images M generated from the first light modulator 300 is on the screen 900. That is, the images M image on the screen 900.

In this embodiment, the optical path from the exit of the second light-uniform element 200 to the first light modulator 300 form a relay system RS. For clarity, the optical path thereof in FIG. 1 is represented by a bold dash line. The coding element 130 is disposed at the aperture stop Stop of the relay system RS. Therefore, the whole light beam 112 passing through the second light-uniform element 200 impinges on the coding element 130. After the coding element 130 adjusts the gray of the light beam 112, the whole light beam 112 reflected from the coding element 130 impinges on the first light modulator 300.

Reference is made to FIG. 2. In one or more embodiments, each of the viewing units U is rectangular and includes X column(s) by Y rows of the reflective elements 132, where X is equal to or greater than 1, and Y is greater than 1. In other words, each of the viewing units U can occupy at least one column or a plurality of columns. The greater the number of columns reduces the viewing area, but the basic brightness of the view is increased. In contrast, the fewer the number of columns increases the viewing area, but the basic brightness of each view is decreased. Hence, the X value can be adjusted according to real acquirements. Moreover, the Y value is greater than 1 for changing the size of the reflective area R. The greater the Y value, the higher the resolution of gray, making the superposed frame more precise. In FIG. 2, X=4 and Y=32, and there are 13 viewing units U. However, the claimed scope of the present invention is not limited with this respect.

In one or more embodiments, a center O of the reflective area R is located at at least one of the reflective elements 132 of the Y/2 row, at at least one of the reflective elements 132 of the (Y+1)/2 row, or between the reflective elements 132 of the Y/2 row and the (Y+1)/2 row. If Y is even, the center O is located between the reflective elements 132 of the Y/2 row (i.e., the 16th row in FIG. 2) and the (Y+1)/2 row (i.e., the 17th row in FIG. 2). If Y is odd, the center is located at the reflective elements 132 of the Y/2 row or at the reflective elements 132 of the (Y+1)/2 row. That is, the reflective area R slightly shifts upward or downward relative to the viewing unit U. But basically, the reflective area R has longitudinal symmetry relative to the viewing unit U, and is expanded or contracted upward and downward equally along the column direction D2 when its size is adjusted.

Reference is made again to FIG. 1. In this embodiment, the first optical module 140 includes a first prism 142 and a second prism 144. The first prism 142 has a first side 142a, a second side 142b, and a third side 142c. The coding element 130 is disposed at the first side 142a. The second prism 144 defines a gap S1 with the second side 142b of the first prism 142. Moreover, the first optical module 140 can further include a reflective mirror 146, and the light field projection device can further include lenses 600 and 650. The lens 600 is disposed between the first light-uniform element 120 and the second light-uniform element 200. The lens 650 is disposed between the second light-uniform element 200 and the reflective mirror 146. The reflective mirror 146 is configured for reflecting the light beam 112 leaving from the second light-uniform element 200 to the first prism 142. Therefore, the light beam 112 provided by the light source 110 sequentially passes through the first light-uniform element 120, the lens 600, the second light-uniform element 200, and the lens 650 and is reflected to the first prism 142 by the reflective mirror 146. The incoming light beam 112 passing through the third side 142c of the first prism 142 is reflected to the first side 142a by the gap S1 and reaches the coding element 130. The coding element 130 then reflects the light beam 112 back to the first side 142a, and the light beam 112 sequentially passes through the gap S1 and the second prism 144 and leaves the first optical module 140. In other embodiments, the reflective mirror 146 can be omitted if the light beam 112 leaving the second light-uniform element 200 can be directly incident to the first prism 142.

The second optical module 500 includes a first prism 510 and a second prism 520. The first prism 510 has a first side 512, a second side 514, and a third side 516. The first light modulator 300 is disposed at the first side 512. The second prism 520 defines a gap S2 with the second side 514 of the first prism 510. Moreover, the second optical module 500 can further include a lens 530 and a reflective mirror 540. The lens 530 is disposed between the first optical module 140 and the reflective mirror 540. The reflective mirror 540 is configured for reflecting the light beam 112 passing through the lens 530 to the first prism 510. Therefore, the light beam 112 leaving from the first optical module 140 passes through the lens 530 and is reflected to the first prism 510 by the reflective mirror 540. The incoming light beam 112 passing through the third side 516 of the first prism 510 is reflected to the first side 512 by the gap S2 and reaches the first light modulator 300. The first light modulator 300 then modulates the light beam 112 into the images M, which are reflected to the first side 512, and the images M sequentially pass through the gap S2 and the second prism 520, leave the second optical module 500, and are incident to the lens 400. In other embodiments, the reflective mirror 540 can be omitted if the light beam 112 passing through the lens 530 can be directly incident to the first prism 510.

Figure 3:
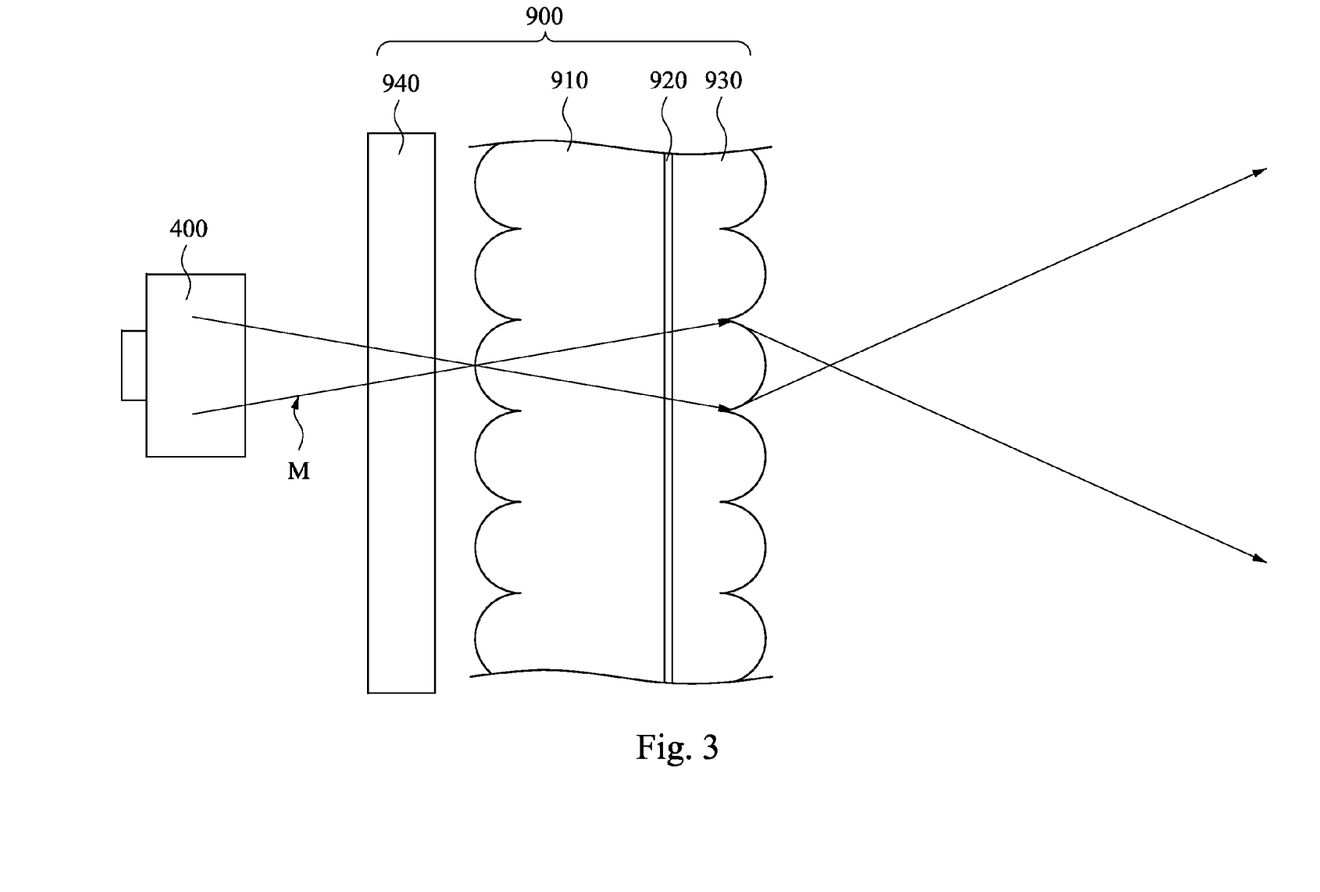
FIG. 3 is an enlarged schematic diagram of a lens and a screen of FIG. 1.

FIG. 3 is an enlarged schematic diagram of the lens 400 and the screen 900 of FIG. 1. In this embodiment, the screen 900 includes a first lenticular lens array 910, a diffuser 920, a second lenticular lens array 930, and a collimating lens 940. The first lenticular lens array 910 is disposed facing the lens 400, the collimating lens 940 is disposed between the lens 400 and the first lenticular lens array 910, and the diffuser 920 is disposed between the first lenticular lens array 910 and the second lenticular lens array 930. The lens 400 is configured for projecting images M of different views to the collimating lens 940, such that the images M become plane light sources and are then incident to the first lenticular lens array 910 to image on the diffuser 920. The images M on the diffuser 920 then pass through the second lenticular lens array 930, where the angles between views are enlarged by the second lenticular lens array 930 and the images M are projected at different views. Therefore, the eyes of an observer can see frames at different views to experience stereoscopic images.

Figure 4:
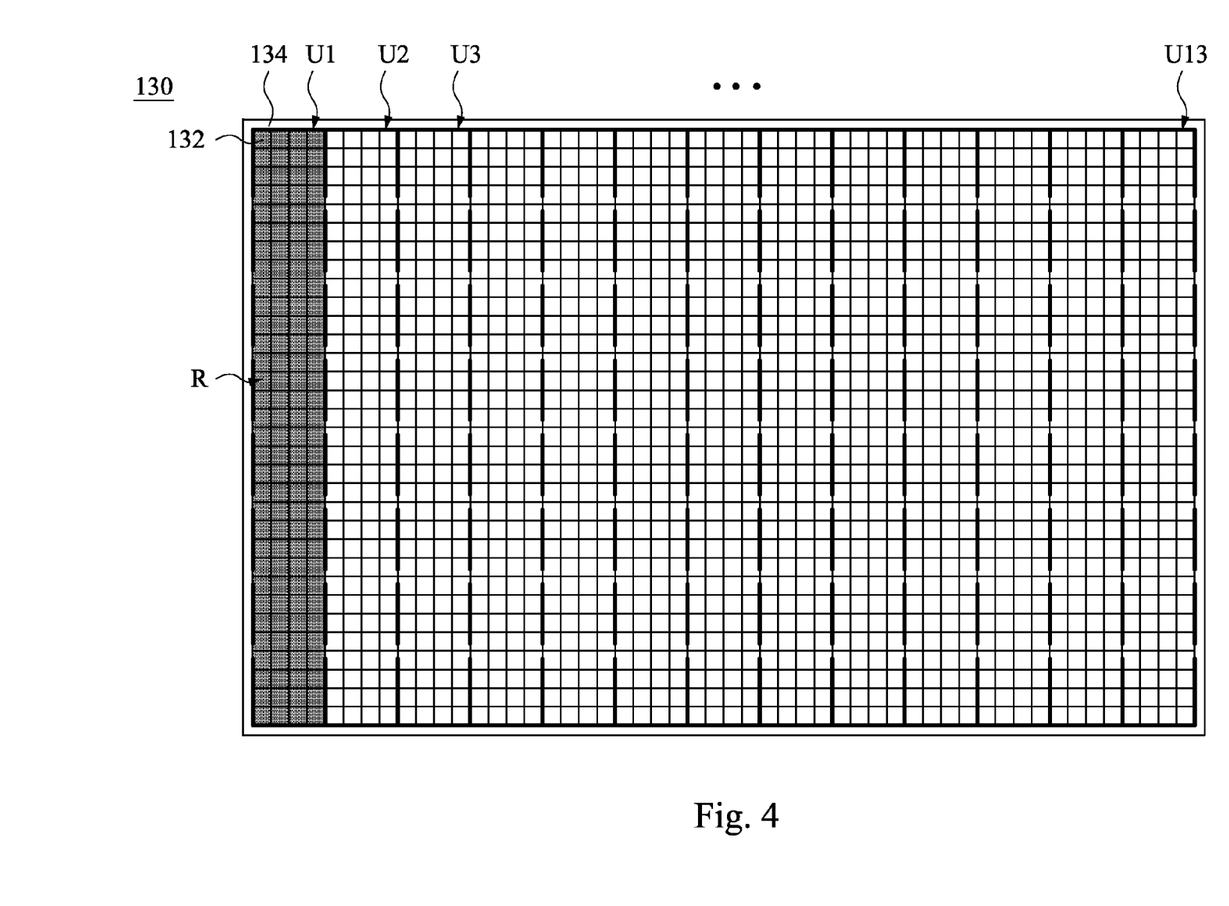
FIG. 4 is a front view of the coding element of FIG. 1 in another time period.

The light field projection device mentioned above can also apply the conventional light field projection method. That is, a single frame is generated in one time period. FIG. 4 is a front view of the coding element 130 of FIG. 1 in another time period. For example, in one time period, the light field projection device provides a frame of the first view. Hence, the reflective area R of the viewing unit U1 has the same size as the viewing unit U1, and the reflective elements 132 in viewing units U2~U13 are all in off state. In the next time period, the light field projection device provides a frame of the second view. Hence, the reflective area R of the viewing unit U2 has the same size as the viewing unit U2, and the reflective elements 132 in viewing units U1, U3~U13 are all in off state. Therefore, the light field projection display can be achieved as long as changing on/off state of the reflective elements 132 of the viewing units U1~U13 in sequence.

Moreover, the light field projection device mentioned above can be applied to two-dimensional display as long as all of the reflective elements 132 are in on state, i.e., the coding element 130 does not code the light beam, in all time periods. Therefore, the gray (intensity) of the light beam 112 can be uniform to achieve two-dimensional display.

Figure 5:
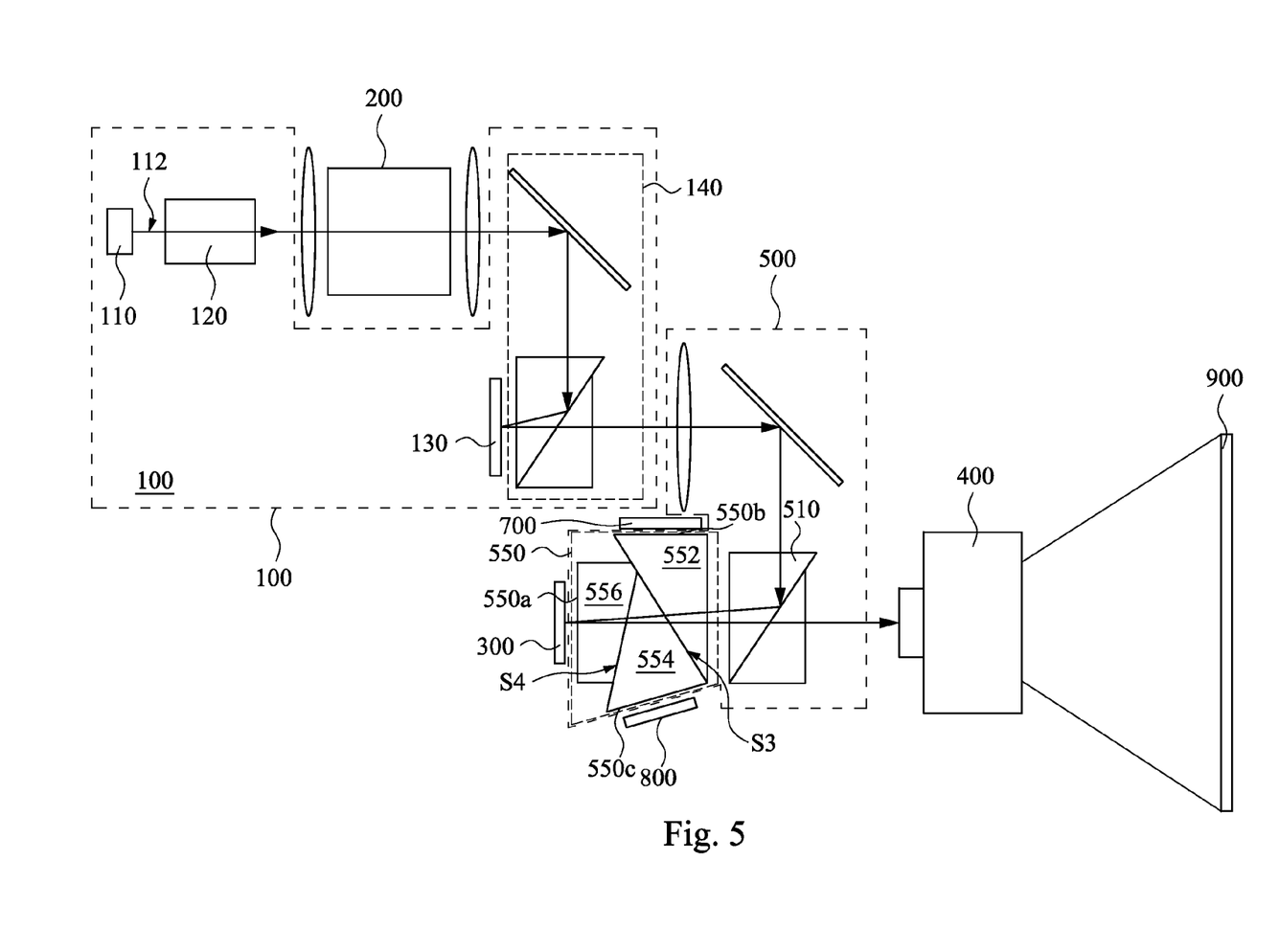
FIG. 5 is a schematic diagram of a light field projection device according to another embodiment of the present invention.

FIG. 5 is a schematic diagram of a light field projection device according to another embodiment of the present invention. For clarity, the optical path of single sub-time period is shown in FIG. 5. The difference between the present embodiment and the embodiment of FIG. 1 pertains to display colors. The light field projection display of FIG. 1 can be applied to monochromatic display since the first light modulator 300 is included. In this embodiment, the light field projection device can be applied to color display. More specifically, the light source 110 can be a light source module for providing different color light in sequence. The light field projection device further includes a second light modulator 700 and a third light modulator 800, and the second optical module 500 further includes a color separation prism group 550 disposed between the first prism 510 and the first light modulator 300. The first light modulator 300, the second light modulator 700, and the third light modulator 800 are respectively disposed at three sides 550a, 550b, and 550c of the color separation prism group 550. More specifically, the first light modulator 300 is disposed at the side 550a, the second light modulator 700 is disposed at the side 550b, and the third light modulator 800 is disposed at the side 550c. The color separation prism group 550 includes a first prism 552, a second prism 554, and a third prism 556. A gap S3 exists between the first prism 552 and the second prism 554, and a gap S4 exists between the second prism 554 and the third prism 556.

In a first sub-time period of the first time period, where the first time period herein is the same as the first time period of the embodiment of FIG. 1, the light source 110 can provide a light beam 112 with a first color (such as green). Since the optical path of the light beam 112 from the light source 110 to the first prism 510 is the same as the embodiment of FIG. 1, and, therefore, a description in this regard will not be repeated hereinafter. After leaving the first prism 510, the light beam 112 sequentially passes through the first prism 552, the second prism 554, and the third prism 556 of the color separation prism group 550 and is incident to the first light modulator 300, which then modulates the light beam 112 into a green image. The green image sequentially passes through the third prism 556, the second prism 554, and the first prism 552 and is incident to the lens 400. Subsequently, in a second sub-time period of the first time period, the light source 110 can provide a light beam with a second color (such as blue). After leaving the first prism 510, the light beam is incident to the first prism 552 of the color separation prism group 550. The light beam is then reflected to the second light modulator 700 by the gap S3 and is modulated into a blue image by the second light modulator 700. The blue image travels back to the first prism 552 and is reflected to the lens 400 by the gap S3. In a third sub-time period of the first time period, the light source 110 can provide a light beam with a third color (such as red). After leaving the first prism 510, the light beam sequentially passes through the first prism 552 and the second prism 554 of the color separation prism group 550 and is reflected to the third light modulator 800 by the gap S4. The third light modulator 800 then modulates the light beam into a red image. The red image then travels back to the second prism 554, is reflected by the gap S4, passes through the first prism 552, and is then incident to the lens 400. Hence, a color image can be generated in the first time period. Subsequently, the aforementioned operation can be repeated in the second time period. Other relevant structural details of the present embodiment are all the same as the embodiment of FIG. 1, and, therefore, a description in this regard will not be repeated hereinafter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light field projection device comprising:
   a coded illuminator comprising:
      a light source for providing a light beam;
      a first light-uniform element for making the light beam uniform;
      a coding element having a plurality of viewing units arranged along a row direction, and the coding element comprising:
         a plurality of reflective elements arranged in an array manner; and
         a control unit connected to the reflective elements, such that in any time period, the reflective elements are respectively in an on state or an off state, wherein in at least one of the viewing units, the reflective elements in the on state, compose a reflective area extending along a column direction that is substantially perpendicular to the row direction, the gray scale of the viewing unit is decided by the number of the reflective elements in the on state; and
      a first optical module for guiding the uniform light beam to the coding element, wherein the light beam reflected from the viewing units travels back to the first optical module and respectively corresponds to different viewing angles;
   a second light-uniform element disposed between the first light-uniform element and the first optical module;
   a first light modulator for sequentially modulating the light beam to a plurality of images, wherein the coding element is disposed at an aperture stop of a relay system formed between the second light-uniform element and the first light modulator;
   a lens; and
   a second optical module for guiding the light beam leaving the first optical module to the first light modulator, and guiding the images to the lens.

2. The light field projection device of claim 1, wherein an image surface of the light beam coming from the exit of the first light-uniform element is on the coding element, an image surface of the light beam coming from the exit of the second light-uniform element is on the first light modulator, and an image surface of the light beam reflected from the coding element is in the lens.

3. The light field projection device of claim 1, wherein the second optical module comprises:
   a first prism having a first side, a second side, and a third side, wherein the first light modulator is disposed at the first side; and
   a second prism defining a gap with the second side of the first prism, wherein the light beam is incident to the first prism from the third side, is reflected to the first side by the gap and reaches the first light modulator, the first light modulator then reflects the light beam back to the first side, and the light beam sequentially passes through the gap and the second prism.

4. The light field projection device of claim 3, further comprising:
   a second light modulator and a third light modulator, and the second optical module further comprising a color separation prism group disposed between the first prism and the first light modulator, wherein the first light modulator, the second light modulator, and the third light modulator are respectively disposed at three sides of the color separation prism group.

5. The light field projection device of claim 1, wherein each of the viewing units of the coding element comprises X columns and Y rows of the reflective elements, where X is equal to or greater than 1, and Y is greater than 1.

6. The light field projection device of claim 5, wherein a center of the reflective area is located at at least one of the reflective elements of the Y/2 row, at at least one of the reflective elements of the (Y+1)/2 row, or between the reflective elements of the Y/2 row and the (Y+1)/2 row.

7. The light field projection device of claim 1, wherein the coding element is a digital micro-mirror device.

8. The light field projection device of claim 1, wherein the optical module comprises:
   a first prism having a first side, a second side, and a third side, wherein the coding element is disposed at the first side; and
   a second prism defining a gap with the second side of the first prism, wherein the light beam is incident to the first prism from the third side, is reflected to the first side by the gap and reaches the coding element, the coding element then reflects the light beam back to the first side, and the light beam sequentially passes through the gap and the second prism.

\* \* \* \* \*